Oct. 29, 1968

L. A. AMTSBERG ET AL 3,407,883

PNEUMATIC NUT-RUNNER WITH A DIFFERENTIAL
PRESSURE SWITCH CONTROL

Filed Dec. 16, 1966

INVENTORS:
LESTER A. AMTSBERG.
WILLIAM K. WALLACE.
BY
Stephen J. Rudy
ATTORNEY

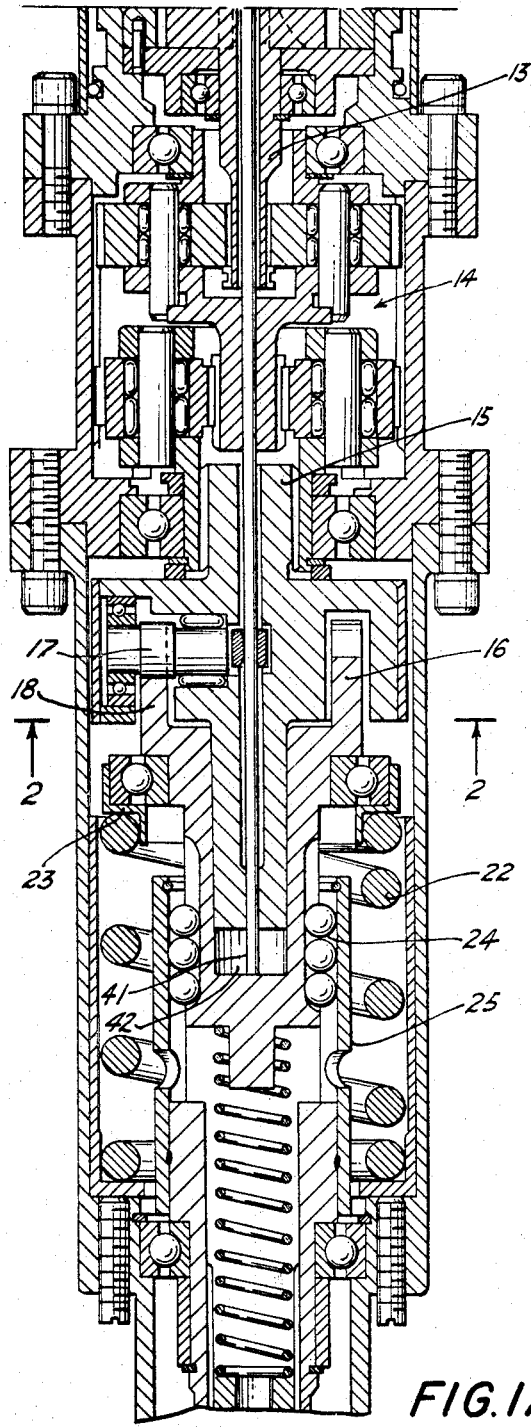
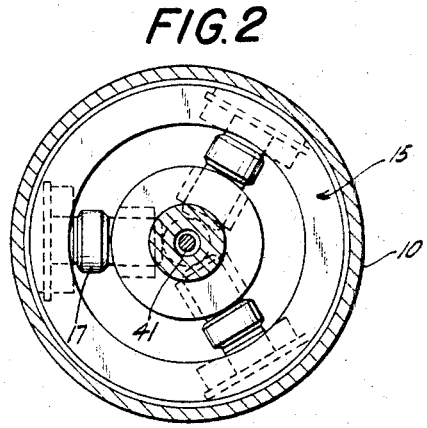
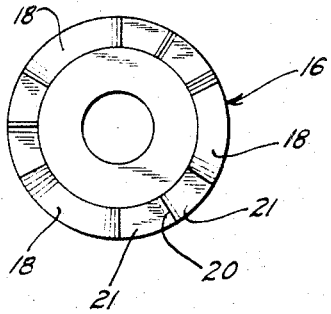
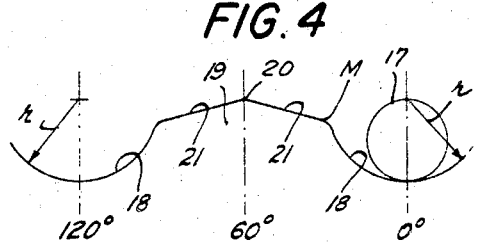

United States Patent Office 3,407,883
Patented Oct. 29, 1968

3,407,883
PNEUMATIC NUT-RUNNER WITH A DIFFERENTIAL PRESSURE SWITCH CONTROL
Lester A. Amtsberg, Utica, and William K. Wallace, Barneveld, N.Y., assignors to Chicago Pneumatic Tool Company, New York, N.Y., a corporation of New Jersey
Filed Dec. 16, 1966, Ser. No. 602,346
8 Claims. (Cl. 173—12)

ABSTRACT OF THE DISCLOSURE

A pneumatic torque controlled nut running tool having a torque responsive clutch, with a pneumatic differential pressure switch control in an electrical circuit determining flow of operating air from a supply line to the tool. The switch has a piston movable relative to a stationary contact. The piston moves to open and closed condition accordingly as a pneumatic differential pressure is developed at one or the other ends thereof. A slide valve, movable from open to closed condition in response to overloading of the clutch, controls the development of differential pressures at the ends of the piston in relation to the time the valve remains open.

---

The invention relates to the art of torque responsive pneumatic tools with operating air supply electrical switch controls.

A pneumatic torque responsive nut running tool with an electrical switch control is known from our co-pending application, Ser. No. 446,315, filed Apr. 7, 1965, and now Patent No. 3,322,205, dated May 30, 1967. This switch is not of a type having a piston subject to pneumatic differential pressures for its operation; accordingly, its mode of operation and structure is materially different from that of the present switch.

In accordance with the invention, there is provided a pneumatic torque controlled nut-running tool comprising a pneumatic motor, valve means controlling live air flow to the motor, a torque releasable cam clutch controlling timed movement of the valve means to open and closed condition, pneumatic pressure switch means controlling live air flow to the valve means; means arranged to cause the switch means to be pneumatically pressured to open condition as a consequence of the valve means remaining open less than a predetermined time interval; and means arranged to cause the switch to be pneumatically pressured to closed condition as a consequence of the valve means remaining open beyond said time interval.

The invention has special significance when used in multiple nut-running applications. While each tool employed in such applications is provided with an individual switch, a separate time delay relay is not required to be associated with each tool in the general circuitry as would be required with the switch of the known art.

In the accompanying drawings:

FIGS. 1 and 1A are continuations in vertical section of a pneumatically powered rotary nut-running tool embodying the invention. FIG. 1 represents the upper portion of the tool; and FIG. 1A represents the lower portion;

FIG. 2 is a detail of the underface of the driving clutch member;

FIG. 3 is a detail of the upper face of the driven clutch member;

FIG. 4 is a development view of a cam lobe of the driven clutch member, including the associated roller;

Figure 1:
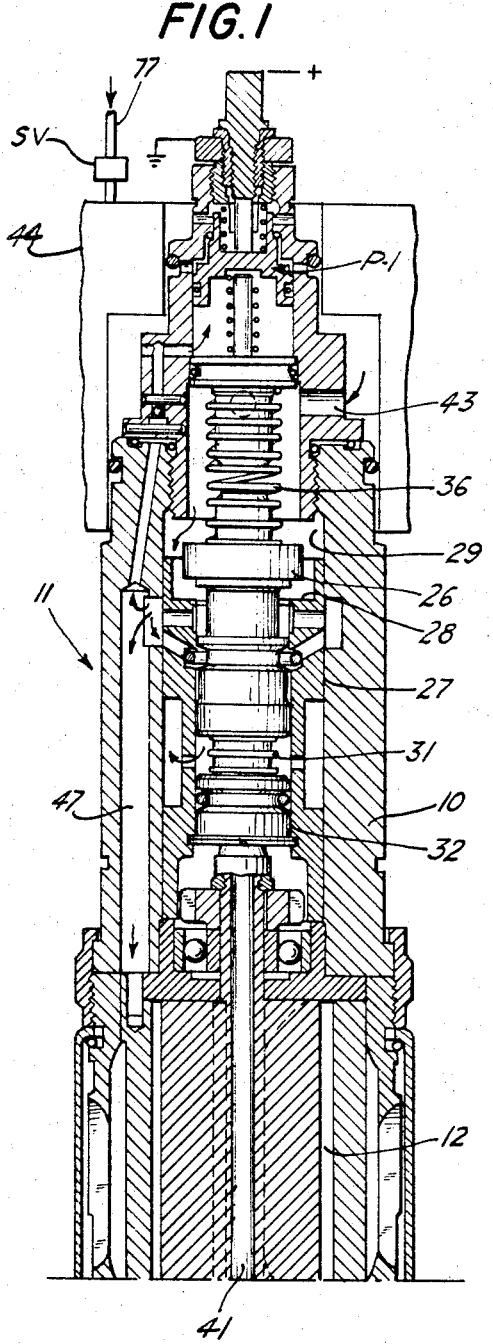

In the drawings, 10 designates the general housing of a nut running tool 11 in which is housed a conventional pneumatically powered rotary motor 12 of the radially slidable vane type. The output end of the motor's shaft 13 is coupled by means of reduction gearing 14 to drive the driving member 15 of a rotary cam clutch. The driving clutch member has a torque releasable driving engagement with a driven cam clutch member 16. This driving engagement (FIGS. 1A, 4) is defined by means of a group of circumferentially and equally spaced rollers 17 carried by the driving member, each having clutched engagement with a separate pocket 18 of the driven member. Each pocket (FIGS. 3, 4) has an inside radius $r$ relatively greater than the radius of the roller 17 engaged therein; and each pocket is circumferentially spaced from the other by means of a cam lobe 19. Here, each lobe is preferably of generally triangular configuration. Each lobe has a crest 20 centered between the neighboring pockets. The crest is defined by a slight outside radius at the vertex of a pair of oppositely sloping cam surfaces 21. Each slope 21 declines at a slight angle and forms a slight outside radius $M$ with the high end of the adjacent pocket. This outside radius $M$ defines a point at which maximum torque is delivered by the driving clutch member to the driven member.

When overloaded, the driven clutch member 16 is cammable axially by the driving member 15 against the resistance of a heavy clutch spring 22 which is constantly biasing the driven member into clutched engagement with the driving member. The engaging force of the spring is transmitted through a bearing cup 23 to the driven member. The driven member has a slidable splined driving connection at 24 with output spindle means 25 connected at its terminal end (broken away) with a work engaging member, such as a wrench socket.

Figure 7:
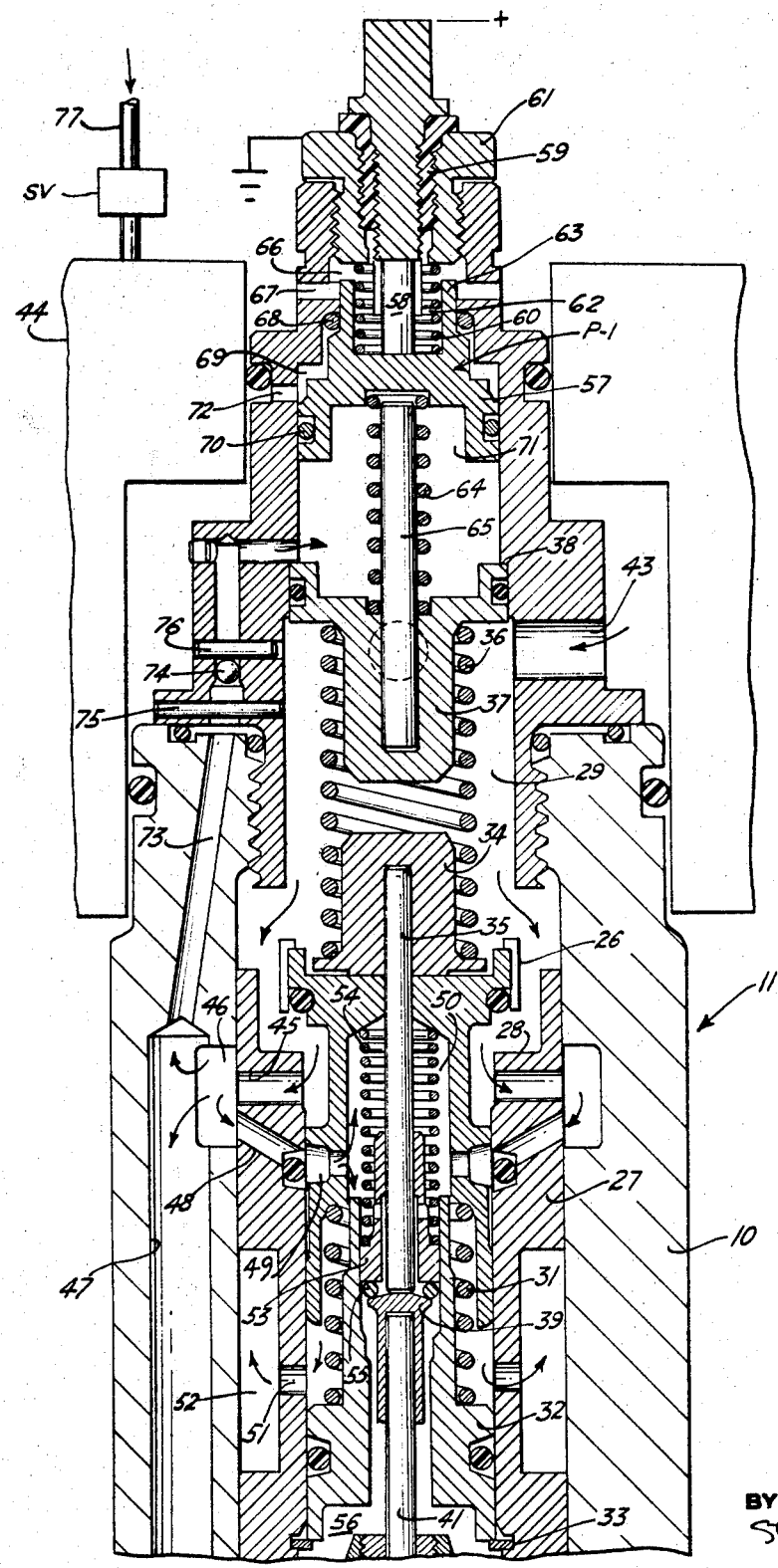
FIG. 7 is an enlarged sectional view of the upper portion of FIG. 1.

A main control valve 26 (FIGS. 1, 7), slidable in an open-ended stationary bushing 27 relative to an annular seat 28 defined about the upper end of the bushing, controls flow of operating air from a main inlet chamber 29 to the motor. A valve opening spring 31, positioned between an internal shoulder of the valve and a shoulder of a pilot valve guide 32, biases the main valve to a normal open condition, and also holds the guide 32 seated upon a retaining ring 33 carried by bushing 27. In its open condition, the main valve is pressed by spring 31 against an overhead spring cup 34. The latter is held seated atop a normally elevated short control slide rod 35 by means of a closing spring 36 for the main valve. The latter spring is compressed between the spring cup 34 and an opposed inverted slidable spring cup 37, the latter being pressed by spring 36 into abutment with an annular shoulder 38 of the housing. The short control rod 35 extends with slight clearance through the head of the main valve; and its bottom end abuts a cap 39 seated atop a long control slide rod 41. The latter depends slidably through the motor shaft into an axial bore 42 of the driven clutch member where it abuts the bottom of the bore. The valve closing spring 36 exerts a greater force upon the main valve than the opposed force of the valve opening spring 31, but is disabled from closing the main valve because of the greater resistance offered by the clutch spring 22 normally holding the clutch members engaged and the control rods 41 and 35 elevated, as best seen in FIGS. 1A and 7.

In the open condition of the main valve 26 (FIG. 7), live air entering the main chamber 29 through ports 43 connnected with an air distributing manifold 44, flows around the open valve to side ports 45 of the bushing. These side ports are connected with a distributing channel or annulus 46 of the housing. Annulus 46 is common to housing passage means 47 leading to the motor chamber, and is also common to other side ports 48 of the bushing. Ports 48 are normally registered with side ports 49 leading through the control valve into an interior pneumatic counter-balancing chamber 50. Chamber 50 opens through the bottom end of the main valve, and communicates by means of side ports 51 through bushing 27 with an isolated annular chamber 52. The latter serves as an extension of the counterbalancing chamber 50. Live air from annulus 46 entering the counterbalancing chamber serves to pneumatically balance the control valve in its open condition during operation of the tool.

A pilot valve 53, slidable relative to the short control rod 35, and normally closed under pressure of a spring 54 upon an O-ring seat 55 supported by the cap 39 of the long control rod, is adapted, when opened, to vent the counter-balancing chamber 50 through passage means generally indicated at 56.

Figure 5:
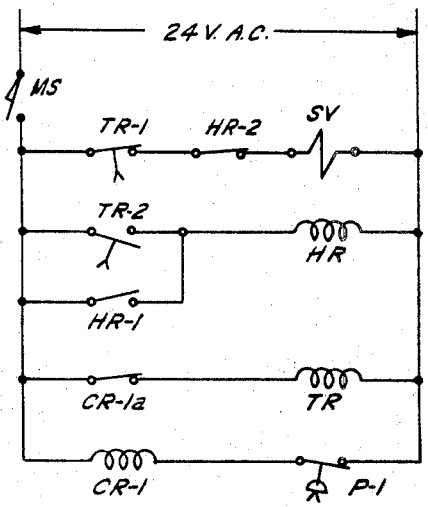
FIG. 5 is a diagram of the monitoring circuit for the control of a single tool.

A pneumatically operable pressure switch P–1 (FIGS. 5 and 7) is provided in the tool for transmitting a signal to an electrical control circuit (FIG. 5) when the tool has delivered a preset maximum degree of torque to the work. The switch includes a cylindrical piston member 57 slidable in the housing relative to an overhead fixed electrical contact 58. The latter contact is electrically insulated from a plug 61 of the housing by means of a collar 59. Contact 58 depends at its bottom end freely into a hollow or recess 62 of a stem portion 63 at the upper end of the piston. A spring 60 seated in the recess and abutting an end of the plug 61 insures a good electrical ground connection between the housing and the piston. A return spring 64 normally biases the piston closed upon contact 58. A pin 65, seated in the inverted spring loaded cup 37 and spaced slightly from the underside of the piston, serves together with spring 64 to dampen movement of the piston. The area 66 above the piston is vented at all times through housing ports 67, so as to avoid an accumulation of trapped air and consequent sluggish movement of the piston. An O-ring 68 about the stem of the piston seals the vented area 66 from a small control chamber 69 formed about the midarea of the piston. An O-ring 70 seals chamber 69 off from a relatively larger pressure chamber 71 provided at the underside of the piston. The entire diameter of the piston at its underside is exposed to the large chamber 71, while a relatively smaller opposed area of the piston is exposed to the smaller chamber 69. The small chamber 69 is connected at all times by means of housing port means 72 directly with the air distribution manifold 44; whereas the larger chamber 71 is connected indirectly with the air supply of the inlet chamber 29 through the main valve 26 by means of a passage 73 branching off the motor feed passage 47. A ball 74 movable in passage 73 between a pair of cross pins 75, 76 is adapted under pressure of air flowing in passage 73 toward the large chamber 71 to move, as appears in FIG. 7, into a narrowed area to restrict or meter flow of air to chamber 71. When the pressure of air in chamber 71 is relatively greater than that in passage 73, the ball 74 is adapted to be moved by the greater air pressure down into a wider area of passage 73 to allow rapid flow and emptying of air from chamber 71. When the pressure exerted in the small control chamber 69 over the piston is greater than opposed pressure being exerted in the larger pressure chamber 71, the piston is forced to open condition relative to its contact 58.

The pressure switch P–1 is integrated in a monitoring circuit (FIG. 5) which controls flow of operating air from a main supply line 77 through a solenoid valve SV into the manifold 44.

To operate the tool, the operator first closes the main switch MS of the circuit. This energizes through normally closed contacts TR–1 and HR–2 the solenoid controlled valve SV to open the supply line 77. Live air then enters the manifold 44 from where it flows through ports 72 to the small control chamber 69 and through ports 43 to the main inlet chamber 29. The air pressure rapidly builds up in the small chamber 69 and forces the piston 57 down to open condition relative to contact 58, before sufficient resisting air pressure can be developed by the metered flow of air from the main chamber 29 through the ball restricted passage 73 to the larger pressure chamber 71. A relay coil CR–1 in the pressure switch line is momentarily energized when the main switch MS is closed, but is immediately de-energized as the pressure switch P–1 is opened. Accordingly, the normally closed contact CR–1a is not then affected by relay CR–1, and remains closed to start energization of a time delay relay TR controlling normally closed contact TR–1 in the solenoid valve circuit line. However, before the pre-set time expires for energization of the time relay TR, sufficient air pressure will have been developed in the pressure chamber 71 to reclose the pressure switch P–1 by returning the piston 57 against its contact 58. This causes energization of coil relay CR–1 and consequent opening of its normally closed contact CR–1a to open the circuit to the time delay relay TR before the latter can be energized. The live air flowing around the open main valve 26 to the annulus 46 also flows through the motor feed passage 47 to operate the motor; it continues flowing through the restricted passage 73 to the pressure chamber 71 to hold the piston 57 closed on its contact; and also flows through the bushing side port 48 and registering ports 49 of the open main valve to fill the counterbalancing chamber 50 so as to pneumatically balance the main valve as the tool operates.

Operation of the motor transmits torque through the clutch elements 15, 16 to run down the work. As overload is experienced by the driving clutch member 15 in bringing the work to a pre-set torque, it advances rotatively relative to the driven member 16. In this action, rollers 17 are carried by the driving member out of the cam pockets of the driven member and over the points of maximum torque delivery M onto the cam slopes 21. As the rollers ride out of the pockets over the points M, the driven clutch member 16 is cammed by the rollers axially against the resistance of the clutch spring 22. The valve closing spring 36 expands in response to this axial movement of the driven clutch member, forcing the spring cup 34 and the control rods 35 and 41 to follow the axial movement of the driven clutch member. The main valve 26 is forced downward toward its seat by the moving spring cup, and the pilot valve 53 is caused as a consequence to also move downward by its overhead spring 54. As the main control valve moves toward its seat, air from the counterbalancing chamber 50 is forced out of the ports 48 to the motor feed passage 47; and momentarily before the main control valve closes upon its seat the pilot valve 53 opens to further vent the counterbalancing chamber. This latter action occurs as the supporting cap 39 is carried downward away from the O-ring 55 by the control rods.

Flow of operating air through the main valve to the motor passage 47, and through the metering passage 73 to the pressure chamber 71 is cut off as the main valve closes. Residual positive energy then remaining in the motor is absorbed by the inherent friction forces of the tool and the resistance of the clutch spring 22, causing the motor and the driving clutch member 15 to be arrested before the rollers 17 can be carried over the crests 20 of the cam lobes. At this time, the pressure in pressure chamber 71 rapidly relaxes as the air therein freely vents through passage 73 and the connected motor feed passages 47. This causes the pressure switch P–1 to open, as the pressure in the smaller control chamber is now able to move the piston 57 away from its contact 58. Following opening of the pressure switch, coil relay CR-1 de-energizes to allow its contact CR-1a to re-close. The timing relay TR then starts to energize. At the same time, following arresting of the motor, the clutch spring 22 relaxes to return the driven clutch member 16 to engaged condition. As the clutch re-engages, a slight reverse rotation is imparted to the motor and driven clutch members to return the rollers down the cam slopes 21 to their pockets 18. As the clutch re-engages, the control rods 35, 41 are re-elevated causing reclosing of the pilot valve 53 and removal of the closing force of the spring 36 from the main valve. But the main valve 26 remains closed until the air entering chamber 50 through the clearance between the short control rod 35 and the main valve 26 can pressurize chamber 50. Once chamber 50 is pressurized, spring 31 forces the main valve open. The time during which the main valve remains closed is momentary. Following re-opening of the main valve, operating air to the motor is resumed and the motor recycles. Repeated recycling operations occur in this manner as long as operating air is being supplied to the valve chamber 29 from the manifold. Assuming that no relaxation or looseness has developed in the tension of the work so that it remains at the predetermined degree of tightness to which it had initially been driven, the rollers will thereafter on each cycle of operation ride out of the pockets as before onto the cam slopes, and each time this occurs operating air flow will be interrupted to the motor. The recycling frequency is at a rate of one or more cycles per second. Because of the rapidity of the recycling operation and the time required to fill and pressurize the large pressure chamber 71 through the restricted passage 73, chamber 71 will be repeatedly vented through passages 73 and 47 before it can become sufficiently pressurized to re-close the piston on its contact. Accordingly, the pressure switch P-1 will remain open as the tool repeatedly recycles the rollers onto the slopes and back to the pockets without transmission of increased torque. While switch P-1 is open, coil relay CR-1 is de-energized and its normally closed contact CR-1a remains closed. If CR-1a remains closed, the tool will repeatedly recycle without increased torque until the time pre-set for energization of the timing relay TR expires.

When finally energized, the relay TR opens its normally closed contact TR-1 to de-energize the solenoid valve to closed condition; and closes normally open contact TR-2 to energize a holding coil relay HR. This closes the holding contact HR-1 and opens contact HR-2. As the solenoid valve closes, live air flow from the supply line 77 to the manifold is shut off causing relaxation of pressure over opposite areas of the piston and automatic closing of the pressure switch piston by means of the return spring 60. As the pressure switch closes, the associated relay CR-1 is energized causing opening of its contact CR-1a and de-energization of the timing relay TR. The latter action causes contact TR-1 to re-close in the solenoid line and contact TR-2 to re-open in the holding relay HR line. However, the holding relay HR remains energized through the holding circuit contact HR-1; and contact HR-2 in the solenoid line is held open by the holding relay to prevent re-energization of the solenoid valve to open condition. The holding circuit also permits the operator at his convenience to re-open the main switch MS to normalize the circuit.

The manifold 44 is adapted to accommodate a plurality of the tools just described according to the needs of the work. Each accommodated tool is fed from the manifold through a separate connection independently of the other tools. When the solenoid valve in the main supply line 77 is closed, operating air flow to the manifold and as a consequence to all of the tools is shut off.

Figure 6:
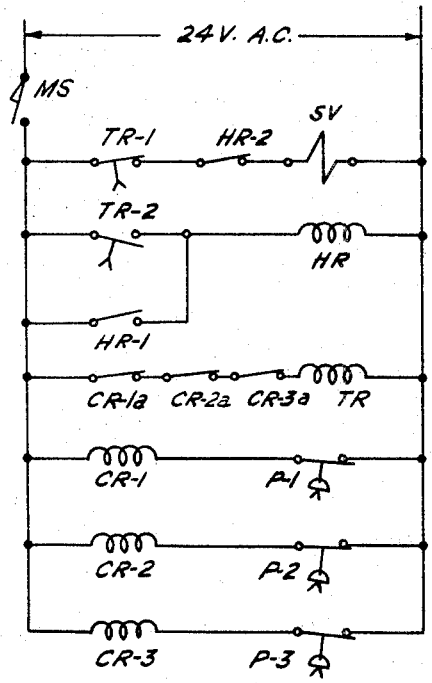
FIG. 6 is a diagram of a modification of the monitoring circuit of FIG. 5 for the control of more than one tool.

The pressure switch of each tool of a multiple number of tools associated with the manifold is integrated in the circuit, as indicated by the pressure switches P-1, P-2 and P-3 in FIG. 6. Each pressure switch is connected in series with a separate coil relay, as indicated by relays CR-1, CR-2 and CR-3; and the combined pressure switch and associated relay of each tool is connected in parallel to the others. The timing relay TR is controlled by a group of series connected normally closed contacts CR-1a, CR-2a and CR-3a, which are respectively controlled by coil relays CR-1, CR-2 and CR-3. It is to be noted that only one time delay relay TR is required. Apart from the addition of a parallel circuit comprising a coil relay and a pressure switch for each tool, and a corresponding contact in the circuit to the time relay, the circuit of FIG. 6 is the same as that of FIG. 5. It is apparent from the earlier description, that as long as one of the normally open series contacts CR-1a, CR-2a, CR-3a in the circuit to the timing relay TR is open, the latter will remain unenergized and the solenoid valve will remain open to supply operating air to the manifold for the several tools. Until a tool has driven its work to the pre-set tightness, its pressure switch will remain closed to energize its associated coil relay and hold the corresponding contact in the time relay circuit open. When, as earlier explained, the work of an individual tool has attained the pre-set torque, its pressure switch remains open to prevent energization of the associated coil relay and to thus allow closing of the corresponding contact in the timing relay circuit. Each tool, accordingly, repeatedly recycles until all of the tools have driven their work to the required tightness, at which time all of the series contacts CR-1a, CR-2a and CR-3a will have been closed, and the timing relay TR will then be finally energized to effect closing of the solenoid valve and final shut-off of operating air to all of the tools.

What is claimed is:

1. A pneumatic torque controled nut-running tool comprising a pneumatic motor, valve means controlling live air flow to the motor, a torque releasable cam clutch controlling timed movement of the valve means to open and closed condition, pneumatic pressure switch means controlling live air flow to the valve means; means arranged to cause the switch means to be pneumatically pressured to open condition as a consequence of the valve means remaining open less than a predetermined time interval; and means arranged to cause the switch means to be pneumatically pressured to closed condition as a consequence of the valve means remaining open beyond said time interval.

2. A pneumatic torque controlled nut-running tool as in claim 1, including a circuit in which the pressure switch means is incorporated, a solenoid valve in the circuit controlling communication of a live air supply line to the valve means, and time delay means in the circuit responsive to the pressure switch remaining open for a certain time interval to actuate the solenoid valve in a particular direction.

3. A multiple torque controlled nut-running apparatus comprising a plurality of nut running tools; a live air supply manifold common to the several tools; each tool having a pneumatic motor, valve means controlling live air flow to the motor, a torque responsive cam clutch controlling timed movement of the valve means to open and closed condition, pneumatic pressure switch means controlling live air flow to the manifold and the valve means, means arranged to cause the switch means to be pneumatically pressured to open condition as a consequence of the valve means remaining open less than a predetermined time interval, and means arranged to cause the switch means to be pneumatically pressured to closed condition as a consequence of the valve means remaining open beyond said time interval; an electrical circuit including a solenoid valve controlling supply of live air to the manifold; a timing arrangement in the circuit including a timing delay adapted when energized to cause actuation of the solenoid valve to closed condition; and the switch means of the several tools controlling contacts connected in series with the timing relay so that upon closing of all of the contacts the timing relay will be energized.

4. In a pneumatic torque controlled nut-running tool having a torque transmitting pneumatic motor and an electrical circuit controlling flow of live air supply to the tool, a pneumatic differential pressure switch control in the circuit including a stationary electrical contact, a differential pressure piston defining a movable electrical contact, the piston having one end of smaller diameter than the other, a small volume chamber containing the smaller end of the piston, a larger volume chamber containing the larger end of the piston, a spring in the larger chamber biasing the piston closed upon the stationary contact, the small chamber being constantly subject to the live air flow urging the piston to open condition against the bias of the spring, passage means communicating the larger chamber with the motor, slide valve means controlling flow of live air to the passage means, ball means in the passage means for metering flow of air from the passage means to the larger chamber when the valve means is open and for dumping air from the larger chamber through the passage means to the motor when the valve means is in closed condition, the piston being adapted to return to closed condition upon the stationary contact upon a pneumatically overbalancing air pressure condition developing in the larger chamber.

5. In a pneumatic torque controlled nut-running tool as in claim 4, including a pre-set torque responsive clutch means coupled to the motor controlling opening and closing of the valve means.

6. In a pneumatic torque controlled nut-running tool as in claim 4, including a valve controlled live air supply line, a solenoid in the circuit controlling operation of the valve in the supply line, and relay means in the circuit responsive to opening of the pressure switch to affect the operation of the solenoid.

7. In a pneumatic torque controlled nut-running tool as in claim 4, wherein dampening means is provided for curbing the extent of movement of the piston an opening direction.

8. In a pneumatic torque controlled nut-running tool as in claim 4, wherein the piston has a hollow stem extending with a slide fit out of the small volume chamber into a further chamber above the small volume chamber, the stationary contact depends through the further chamber into the hollow of the stem, and ports continually vent the further chamber to prevent air that may leak around the stem from the small volume chamber into the further chamber from becoming trapped in the latter.

References Cited

UNITED STATES PATENTS

| | | | |
|---|---|---|---|
| 3,093,114 | 6/1963 | Heidler | 91—38 X |
| 3,315,754 | 4/1967 | Holdo et al. | 173—12 |

ERNEST R. PURSER, *Primary Examiner.*